United States Patent [19]
Hazrati et al.

[11] Patent Number: 6,096,210
[45] Date of Patent: *Aug. 1, 2000

[54] SCREENING SYSTEM

[75] Inventors: Azar M. Hazrati, Maineville, Ohio; Bradley N. Jones, Walton; Keith J. King, Owenton, both of Ky.

[73] Assignee: Emerson Electric Co., St. Louis, Mo.

[ * ] Notice: This patent is subject to a terminal disclaimer.

[21] Appl. No.: 09/387,178

[22] Filed: Aug. 31, 1999

Related U.S. Application Data

[62] Division of application No. 08/739,511, Oct. 28, 1996, Pat. No. 5,951,864.

[51] Int. Cl.$^7$ ................................................ G01D 24/30
[52] U.S. Cl. .................. 210/388; 210/406; 210/232; 209/326; 209/332; 209/273; 209/367
[58] Field of Search ..................... 210/388, 406, 210/232; 209/268, 273, 326, 332, 336.5, 367

Primary Examiner—Christopher P. Ellis
Assistant Examiner—Joe Dillon, Jr.
Attorney, Agent, or Firm—Lyon & Lyon LLP

[57] ABSTRACT

A vibratory separator having a resiliently mounted housing with a vibratory drive. A screen extends across the housing and a cover is positionable over the screen. The screen includes a discharge port therethrough aligned with a discharge passage for removing material from the top of the screen from the system. Another discharge passage cooperates with a manifold plate extending across the separator beneath the screen. An access port is provided through the cover and arranged to receive a discharge plug which can selectively close the discharge hole through the screen. In operation, separating or dewatering is first accomplished, the energy level of the vibration is reduced and a vacuum is drawn above the screen. Bleed air is allowed into the separator below the screen with a restricted flow so that a vacuum can be drawn. Once the material has dried, the vibrational energy can be increased and the plug removed from the hole through the screen. The process material may then be discharged from the unit.

23 Claims, 5 Drawing Sheets

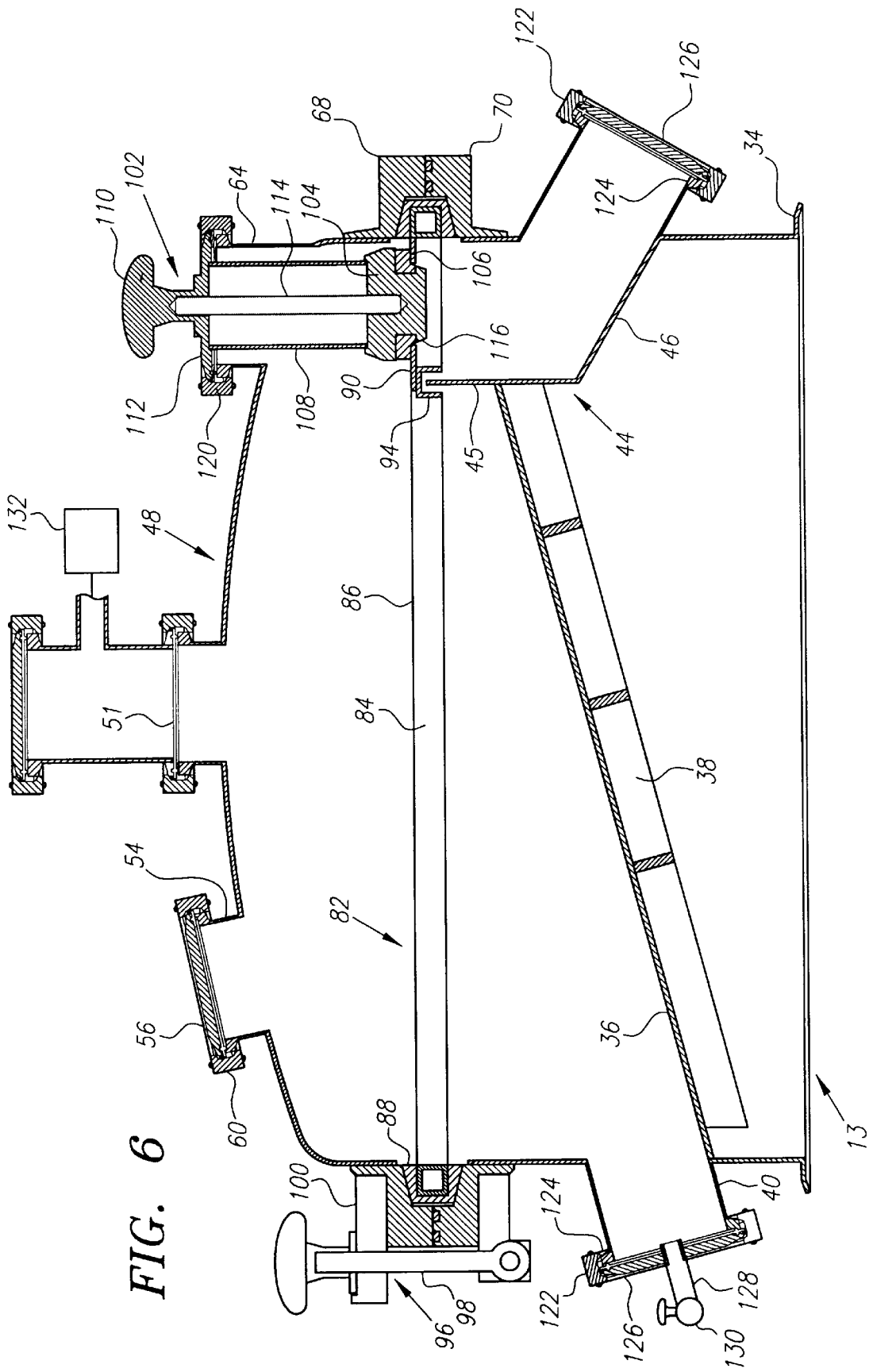

SCREENING SYSTEM

This application is a divisional of U.S. application Ser. No. 08/739,511, filed on Oct. 28, 1996 now U.S. Pat. No. 5,951,864.

BACKGROUND OF THE INVENTION

The field of the present invention is vibratory screening systems.

Vibratory screening using a resiliently mounted housing with one or more vibration generators attached thereto and a screen extending across the housing is well known. A great variety of motions, screen configurations and screen materials are available. Such systems are used for dry powder separation and sifting, wet screening and dewatering. Depending on the materials being processed, safety factors and environmental considerations, covers and hoods have also been used.

Recent patents disclosing such systems and components include U.S. Pat. No. 4,613,432; U.S. Pat. No. 4,810,372; U.S. Pat. No. 4,968,366; U.S. Pat. No. 5,032,210; U.S. Pat. No. 5,051,171; U.S. Pat. No. 5,134,893; U.S. Pat. No. 5,226,546; U.S. Pat. No. 5,242,058; U.S. Pat. No. 5,255,789; U.S. Pat. No. 5,265,730; U.S. Pat. No. 5,271,504; and U.S. Pat. No. 5,456,365, the disclosures of which are incorporated herein by reference.

The demands upon equipment for handling and processing materials are quite stringent in certain highly technical areas. Clean room manufacturing and material handling frequently require rigid controls against contamination, inert surfaces and the ability to completely clean systems between uses. At the same time, stringent requirements on processing effectiveness remain.

SUMMARY OF THE INVENTION

The present invention is directed to a screening system having particular applicability in clean room environments.

In a first, separate aspect of the present invention, a vibratory screen separator includes a screening system which has a sealable resiliently mounted housing with a screen extending across the housing, a vibratory drive coupled to the housing, a vacuum source in communication with one side of the screen and a bleed line having a valve in communication with the other side of the screen.

In a second, separate aspect of the present invention, a vibratory screen separator includes a screening system which has a resiliently mounted housing with a screen extending across the housing and having a discharge port therethrough, a vibratory drive coupled to the housing, a discharge plug positionable in the discharge port and a first discharge passage fixed to the housing and sealed with the discharge port.

In a third separate aspect of the present invention, the vibratory separator of the second separate aspect may further include a sealable access port adjacent the discharge port for access to place and remove the discharge plug from the discharge port. The access port may be in the cover of the housing. A manifold may extend across and be fixed to the housing below the screen with a second discharge passage extending from the manifold.

In a fourth separate aspect of the present invention, the foregoing separate aspects are also contemplated to be employed together to greater advantage.

Accordingly, it is an object of the present invention to provide improved screening systems. Other and further objects and advantages will appear hereinafter.

BRIEF DESCRIPTION OF THE DRAWINGS

FIG. 6 is a cross-sectional side view of the housing and cover of FIG. 2 in a vacuum mode.

DETAILED DESCRIPTION OF THE PREFERRED EMBODIMENT

Figure 1:
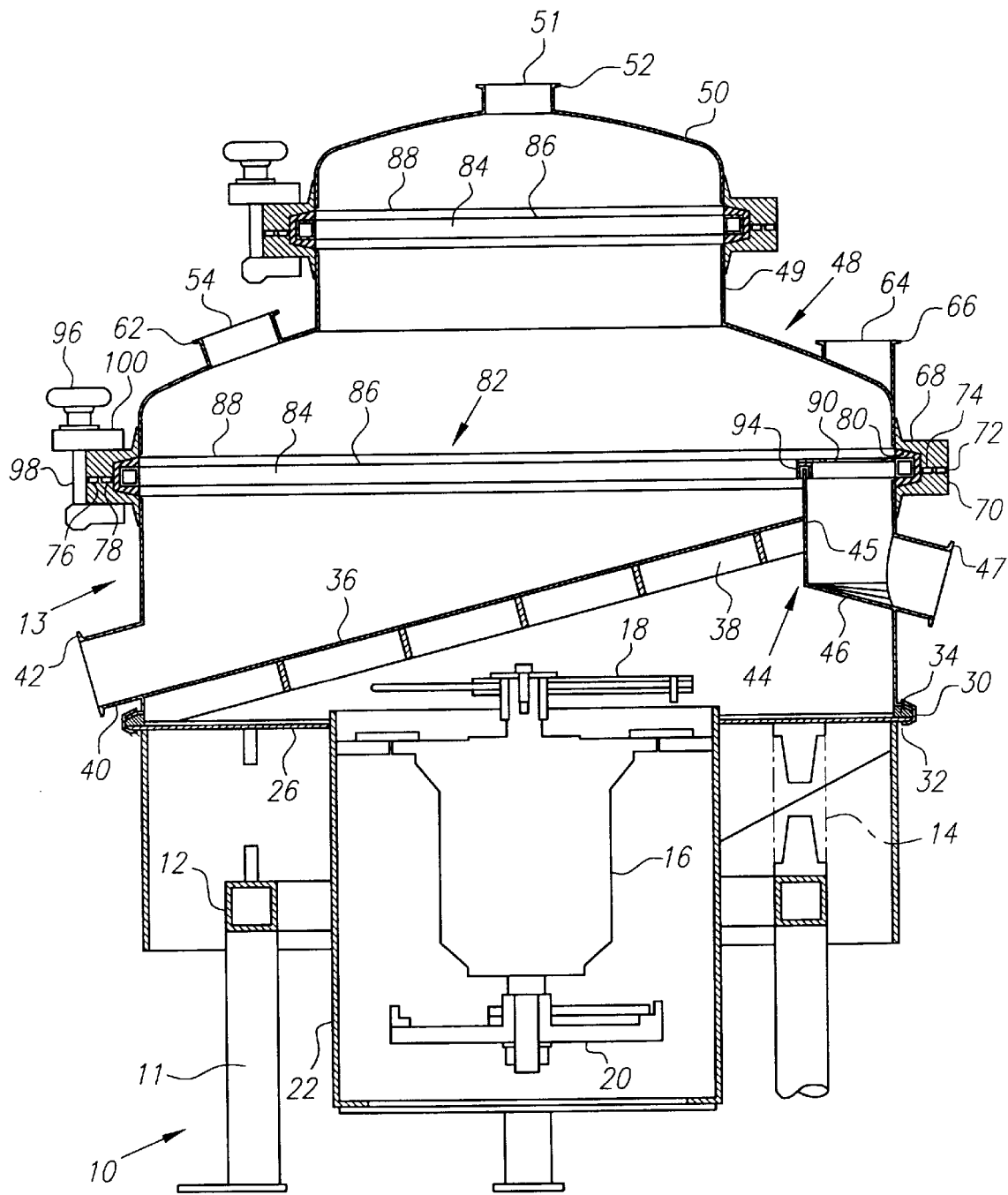
FIG. 1 is a cross-sectional side view of a separator.

Turning in detail to the drawings, a vibratory screen separator is illustrated which includes a base 10 for supporting the entire system. The base 10 in this embodiment includes three legs 11 with a circular frame 12 to raise the system to a convenient height. A housing, generally designated 13, is resiliently mounted to the base 10 by means of springs 14. In this embodiment, the housing 13 is cylindrical. The resiliently-mounted housing 13 is driven to vibrate by a vibratory drive including a motor 16 to which are attached eccentric weights 18, 20 preferably mounted to the motor shaft at the top and bottom. The bottom eccentric weights 20 may be of a type which can be varied manually or be varied automatically depending upon the direction of motor rotation.

The vibratory drive is enclosed in a stainless steel drive housing 22. The drive housing 22 is substantially sealed. It may have a vacuum outlet and an air inlet for ventilation and cooling. Vacuum is typically available in clean rooms and the environment is typically maintained as dry air. Appropriate equipment can be provided as needed to supply these needs. An air tight window access is associated with the drive housing 22 to facilitate adjustment and service. The drive housing is shown to be associated with the housing 13 and will, therefore, vibrate with the housing 13.

The vibratory drive is associated with the underside of the housing 13 which includes a structural plate 26 with gussets 28. The motor 16 is fixed to the drive housing 22 which is in turn fixed to the structural plate 26. The plate 26 is associated with the rest of the housing 13 by a conventional band clamp 30 and gasket 32. A flange 34 at the lower end of the housing 13 is associated with the band clamp 30.

A plate is welded to the interior of the housing 13 at a slope to create a manifold 36 for receiving flow through the screen deck. Support plates 38 stiffen the manifold 36. A discharge passage 40 extends from the manifold 36 to outwardly of the housing 13. This discharge passage 40 is also welded or otherwise formed to be a solid part of the housing 13. The passage 40 extends to a mounting flange 42 to accommodate a closure assembly or camp band.

Also within the housing 13 is a discharge passage 44 which extends downwardly from the screen deck and then outwardly through the wall of the housing 13. This discharge passage 44 includes a weldment substantially rectangular in cross section using the outer wall of the housing 13 to define a down chute 45 from an upper edge just below the screen deck. A lower surface 46 closes the chute 45 and terminates in the tube through the wall of the housing 13. A flange 47 is provided for attachment. The entire housing assembly with the manifold 36 and the discharge passages is typically an assembled weldment.

A main cover, generally designated 48, is shown positioned to close the upper portion of the housing 13. The main cover 48 includes sides configured to align with the sides of the housing 13 which is, in this case, cylindrical.

In the embodiment of FIG. 1, the main cover 48 includes an upper screen deck. The central portion of the main cover 48 includes a cylindrical housing 49 extending upwardly to an upper cover 50. A screen deck is provided which has much the same features as the lower screen deck which is described below and reference is made thereto. This screen may be used to break up caked material and the like.

Figure 2:
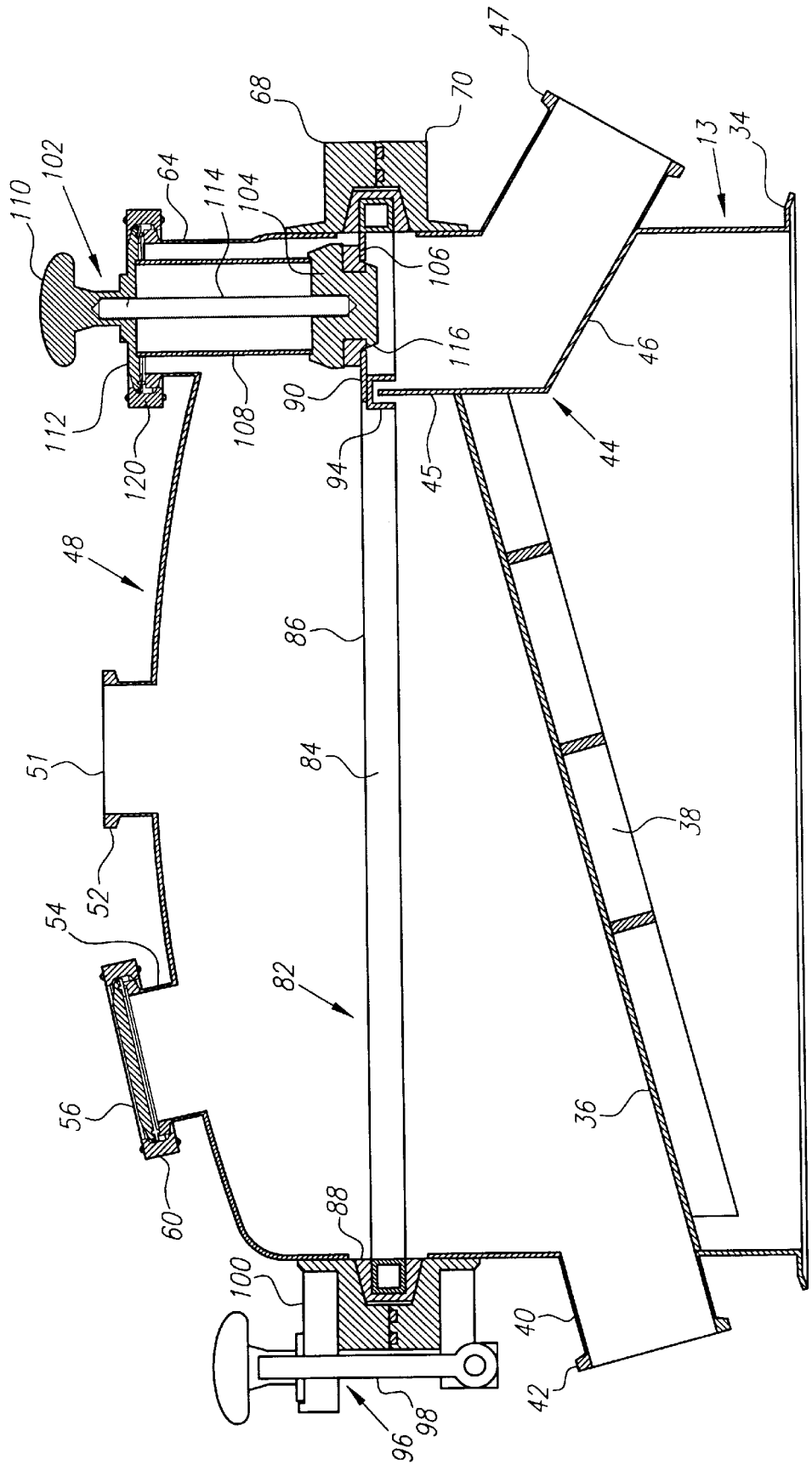
FIG. 2 is a cross-sectional side view of the housing and cover of a separator.
Figure 3:
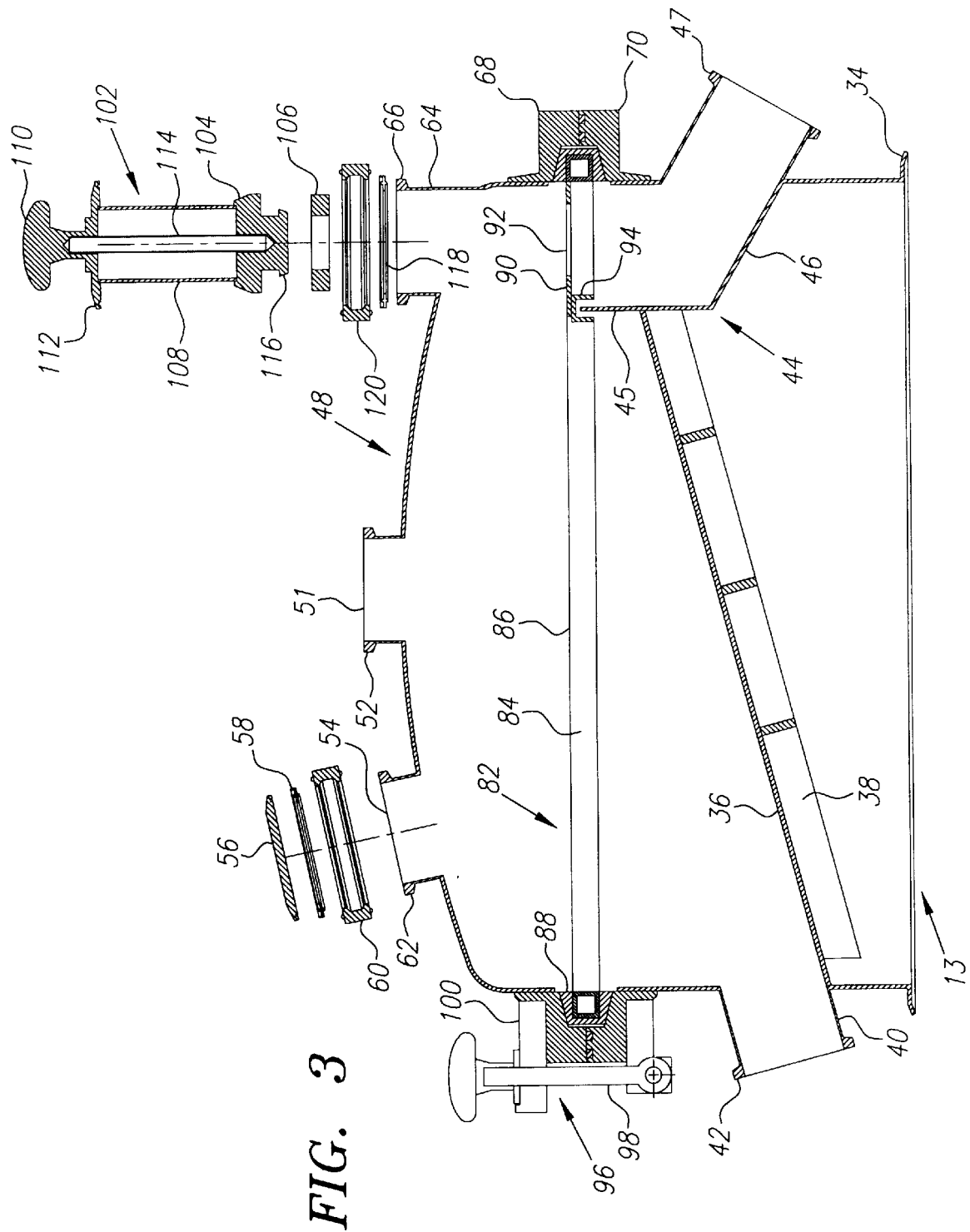
FIG. 3 is a cross-sectional side view of the housing and cover of FIG. 2 shown in partially exploded assembly.
Figure 4:
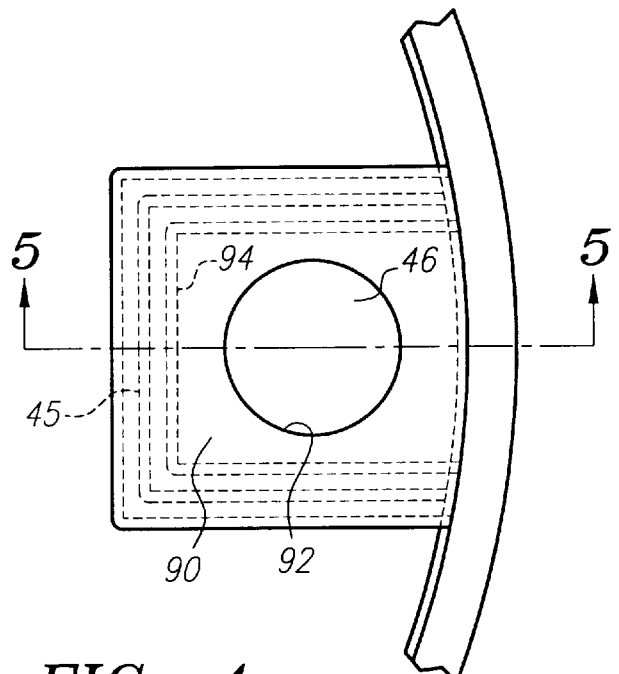
FIG. 4 is a plan detail of the discharge port.
Figure 5:
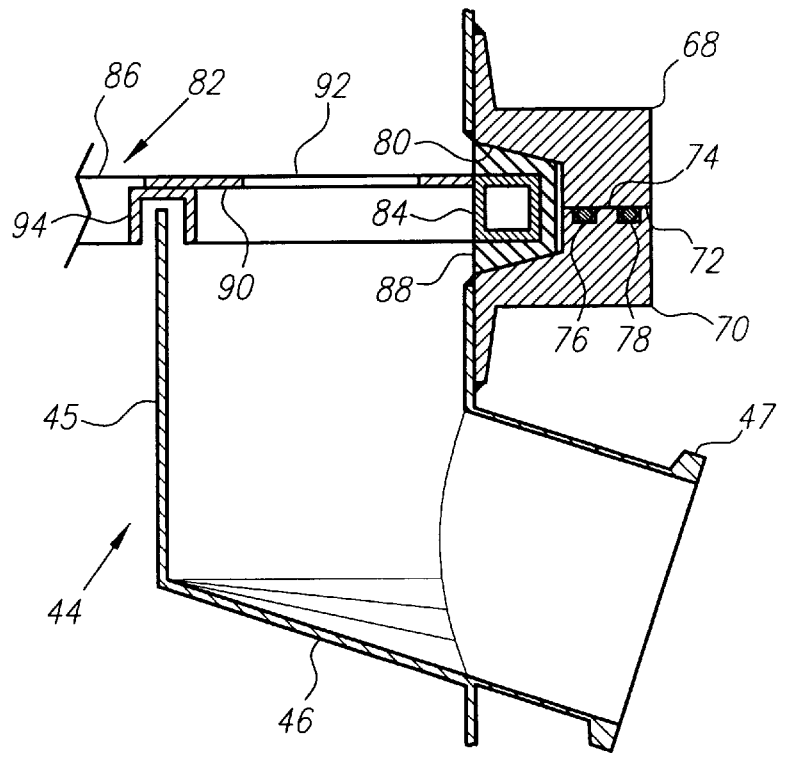
FIG. 5 is a cross-sectional detail taken along the line 5—5 of FIG. 4.

Three ports are shown through the cover or covers. In the embodiment of FIG. 1, two ports are shown through the main cover 48 and the other through the upper cover 50. In the embodiment of FIG. 2 and following, the ports are all through the main cover 48. Each port is preferably less than 10% of the overall area of the cover so as to avoid structural problems under vacuum. An inlet port 51 is conveniently located along the vertical centerline of the unit. This inlet port 51 also includes a flange 52 for coupling with delivery equipment. An observation port 54 is provided off center on the cover 48. It is similarly constructed to that of the inlet port 51 and preferably includes a sight glass 56, a gasket 58 and a closure or clamp assembly 60 cooperating with the flange 62. Finally, an access port 64 is similarly constructed and positioned adjacent to the peripheral edge of the cover 48. The access port 64 includes a flange 66 for attachment.

To assemble the cover 48 with the housing 13 in both embodiments, peripheral flanges 68 and 70 are fixed to the lower edge of the cover 48 and the upper edge of the housing 13, respectively. The flanges 68 and 70 are typically welded to the structures. The joint between the flanges 68 and 70 and their respective cover 48 and housing 13 are preferably tight so that there is no leakage with the structure subjected to vacuum. The peripheral flanges 68 and 70 have opposed mating surfaces 72 and 74. In the surface 74, channels are cut to receive two EPDM O-rings 76 and 78 which extend fully about the structure. EPDM is the common name for pharmaceutical grade elastomer made of ethylene propylene diene monomer which is substantially inert to most solvents and unreactive with pharmaceutical compounds. The O-rings compress against the surface 72 to seal the structure independently of any seal associated with a screen structure. The peripheral flanges 68 and 70 also each contain a profile generating an inwardly facing channel 80. The walls of the channel 80 have draft so that the channel 80 is wider at the opening than at the base.

A screen, generally designated 82, includes a frame 84 and screen cloth 86. The frame 84 and screen cloth 86 are most conventionally stainless steel with the screen cloth 86 tensioned and bonded to the frame 84. In the preferred embodiment, the housing 13 and cover 48 are circular. The screen frame 84 is also circular for that reason. The frame 84 is conveniently substantially square in cross section and is shown in this embodiment to be larger than the principal diameter of the housing 13. In this way, the screen 82 may be positioned with the frame 84 extending well into the inwardly facing channel 80.

An EPDM screen gasket 88 of U-shape cross section is positioned about the screen frame 84 and compressed within the inwardly-facing channel 80 defined by the peripheral flanges 68 and 70. The gasket 88 extends over the bonding area between the screen cloth 86 and the screen frame 84 so that no cracks, joints and recessed areas are available within the interior of the housing 13 at the screen for processing material to collect. The upper screen deck of FIG. 1 is similarly constructed, as is the screen to this point in the description.

The lower screen 82 includes a plate 90 which is bonded to the under side of the screen cloth 86. A discharge port defined by a hole 92 is central to the plate 90. The screen cloth 86 does not extend over the hole 92. The plate 90 is positioned below the screen cloth in order that material is unimpeded in its movement to the hole 92. The plate 92 has a channel 94 extending downwardly from three edges. This channel 94 is also welded to the frame 84. The hole 92 is conveniently located adjacent to the periphery but may be located at any desired position on the screen.

The hole 92 in the screen 82 defines a discharge port for the materials unable to pass through the screen. The discharge passage 44 extends from this discharge port to outwardly of the housing 13. With the screen properly indexed in the housing 13, the channel 94 fits over the upper end of the structural portion of the discharge passage 44 which is fixed to the side of the housing 13. A labyrinth seal is thus created to prevent water from flowing into the discharge passage. Consequently, material remaining on the screen 82 can flow to the hole 92 and from that upper end of the discharge passage pass outwardly of the housing 13. With the hole 92 plugged, only flow of fines and moisture can pass through the screen 82. Because of the channel 94, water flowing through the screen cannot flow into the discharge passage associated with the hole 92.

A first clamp 96 is illustrated for assembling the housing 13 and the cover 48. Two such clamps are believed to be sufficient for this purpose. Four are contemplated. More clamps can be added as necessary. The clamps 96 each conveniently employs a swing bolt 98 received in a slot defined by an upper bar 100. The clamps 96 provide sufficient strength and the flanges 68, 70 sufficient rigidity to maintain the seal between the housing 13 and the cover 48 under vibration and with the gasket 88 compressed around the screen frame 84.

A discharge plug 102 is positionable through the access port 64 to close the hole 92. With the cover 48 properly indexed, the access port 64 is aligned with the hole 92 and is larger than the hole 92 so that the discharge plug 102 may pass through the access port and into engagement with the plate 90. The discharge plug 102 includes a plug element 104 receiving an EPDM gasket 106. The body of the plug 102 is defined by a cylindrical spacer 108. At the upper end of the plug 102, a handle 110 includes a flange 112. A threaded rod 114 retains the assembly together. A conical end on the plug element 104 assists in the location of the discharge plug 102 into the hole 92.

Placement of the discharge plug 102 in the structure locates the conical end 116 in the hole 92. The EPDM gasket 106 comes to rest on top of the screen about the hole 92 to form a seal. An EPDM gasket 118 is positioned atop the access port 64 and receives the flange 112. A clamp assembly 120 is used to retain the flange 112 with the flange 66 with the gasket 118 therebetween.

In operation, a screen 82 is positioned within the housing 13. A cover 48 is then positioned on the housing 13 with the access port 64 aligned with the hole 92 in the screen 82. The discharge plug 102 is positioned to close the hole 92 and all elements are clamped together. The screen is vibrated using the vibratory drive and the material is fed into the inlet port 51. In the event that the material is to be dewatered, the separator is run until substantially all of the free water or other liquid flows through the screen and is discharged to the manifold 36 and through the discharge passage 40. The vibratory motion of the separator can be adjusted according to conventional techniques to cause the material on the screen to tend toward the center of the screen. Once sufficiently dewatered, the discharge passages 40 and 44 are closed. Closure is accomplished in each case by a clamp assembly 122 associated with an EPDM gasket 124 and a cap plate 126 effectively acting as valves. A bleed line extends into the housing below the screen. In this instance, a bleed line 128 is associated with the cap plate 126 which is placed on the discharge passage 40. A valve 130 may be provided on the bleed line 128 to regulate flow. A vacuum is drawn on the inlet port 51 by a vacuum source 132. The bleed line is adjusted or configured to provide substantially more resistance to gas flow than the vacuum source. Consequently, a vacuum can be drawn on the separator even with the bleed line 128 open. In clean room environments, the bleed line may draw directly from the dry atmosphere around the separator. Alternatively, special provision may be employed to insure dry, clean air is drawn into the separator.

During the vacuum phase of the drawing process, the vibrational energy created by the vibratory drive is reduced. This reduction is intended to reduce the distribution of the drying material onto the surfaces of the separator other than the screen 82. The vacuum operates to increase the efficiency of evaporation. Further, bleeding air in below the screen 82 with vibration of the screen 82 causes flow up through the screen to separate the material from the screen 82, break up caking and unblind the screen.

Once the material is sufficiently dried, the discharge plug 102 may be withdrawn. The vibratory motion is preferably increased and altered in character such that the material on the screen will move to the outer periphery where it can pass through the hole 92. The operation of vibration throughout assists in avoiding the material from forming into a cake as it is dried.

The uses of this screening system contemplates batch processes and frequent cleaning. Cleaning is achieved by removing the screen and clamping conventional cleaning heads onto the several ports in the housing and cover. Such heads provide spray nozzles or steam nozzles to completely wash the interior of the system. The screen 82 would be separately washed, also in a conventional manner.

Accordingly, an improved screening system and method of using that system are disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A screening system comprising
    a resiliently mounted housing, the housing being sealable;
    a vibratory drive coupled to the housing;
    a screen extending across the housing;
    a vacuum source in communication with the interior of the sealable housing to one side of the screen;
    a bleed line in communication with the interior of the sealable housing to the other side of the screen and including a valve therein.

2. The screening system of claim 1, the vacuum source being above the screen.

3. The screening system of claim 1 further comprising
    a discharge passage fixed to the housing, the screen including a discharge port therethrough, the discharge passage extending from the discharge port and being sealed with the discharge port from the housing outwardly of the discharge passage.

4. The screening system of claim 3, the discharge port and the discharge passage defining a labyrinth seal therebetween.

5. The screening system of claim 3 further comprising
    a discharge plug positionable in the discharge port.

6. The screening system of claim 5, the housing including a sealable access port adjacent the discharge port for access to place and remove the discharge plug from the discharge port.

7. The screening system of claim 6, the housing including a cover enclosing the housing above the screen, the access port being through the cover.

8. A screening system comprising
    a resiliently mounted housing;
    a vibratory drive coupled to the housing;
    a screen extending across the housing and having a discharge port therethrough;
    a discharge plug positionable in the discharge port;
    a first discharge passage fixed to the housing, the first discharge passage extending from the discharge port and being sealed with the discharge port from the housing outwardly of the first discharge passage.

9. The screening system of claim 8, the discharge port and the first discharge passage defining a labyrinth seal therebetween.

10. The screening system of claim 8 further comprising
    a manifold extending across and fixed to the housing below the screen;
    a second discharge passage extending from the manifold.

11. The screening system of claim 8, the housing including a sealable access port adjacent the discharge port for access to place and remove the discharge plug from the discharge port.

12. The screening system of claim 11, the housing including a cover enclosing the housing above the screen, the access port being through the cover.

13. A screening system comprising
    a resiliently mounted housing, the housing being sealable;
    a vibratory drive coupled to the housing;
    a screen extending across the housing;
    a vacuum source in communication with the interior of the sealable housing to one side of the screen;
    a bleed line in communication with the interior of the sealable housing to the other side of the screen and including a valve therein;
    a first discharge passage fixed to the housing, the screen including a discharge port therethrough, the first discharge passage extending from the discharge port and being sealed with the discharge port from the housing outwardly of the first discharge passage;
    a discharge plug positionable in the discharge port;
    a manifold extending across and fixed to the housing below the screen;
    a second discharge passage extending from the manifold.

14. The screening system of claim 13, the housing including a sealable access port adjacent the discharge port for access to place and remove the discharge plug from the discharge port.

15. The screening system of claim 14, the housing including a cover enclosing the housing above the screen, the access port being through the cover.

16. A screening process using a vibratory screen, comprising
    depositing material on the screen;

fully enclosing the screen after depositing the material;

vibrating the material on the screen;

drawing a vacuum from one side of the screen;

bleeding dry gas toward the other side of the screen such that the pressure at the screen is substantially below atmospheric.

17. The screening process of claim 16, vibrating the material on the screen occurring while drawing a vacuum and bleeding dry gas.

18. The screening process of claim 16, vibrating the material on the screen including vibrating the material on the screen at a first vibrational energy level before drawing a vacuum and bleeding dry gas and vibrating the material on the screen at a second, reduced vibrational energy level while drawing a vacuum and bleeding dry gas.

19. The screening process of claim 16, drawing a vacuum being from above the screen.

20. The screening process of claim 16 using a vibratory screen with a discharge port therethrough and further comprising plugging the discharge port before depositing material on the screen;

releasing the vacuum after drawing a vacuum from one wide of the screen;

unplugging the discharge port after releasing the vacuum.

21. The screening process of claim 16 using a vibratory screen with a discharge port therethrough and further comprising plugging the discharge port before depositing material on the screen;

releasing the vacuum after drawing a vacuum from one wide of the screen;

unplugging the discharge port after releasing the vacuum, vibrating the material on the screen including vibrating the material on the screen at a first vibrational energy level before drawing a vacuum and bleeding dry gas and vibrating the material on the screen at a second, reduced vibrational energy level while drawing a vacuum and bleeding dry gas;

vibrating the material on the screen at a third vibrational energy level after unplugging the discharge port.

22. The screening process of claim 21 using a vibratory screen with a discharge port therethrough, vibrating the screen at a third vibrational energy level being at a higher energy level than the second vibrational energy level.

23. The screening process of claim 21 using a vibratory screen with a discharge port therethrough adjacent the periphery of the screen, vibrating the material on the screen at the first vibrational energy level being with motion concentrating the material toward the center of the screen and vibrating the material on the screen at the third vibrational energy level being with motion concentrating the material toward the periphery of the screen.

* * * * *

UNITED STATES PATENT AND TRADEMARK OFFICE
CERTIFICATE OF CORRECTION

PATENT NO. : 6,096,210
DATED : August 1, 2000
INVENTOR(S) : HAZRATI et al.

It is certified that error appears in the above-identified patent and that said Letters Patent is hereby corrected as shown below:

In claim 20 (Col. 7, line 25), delete "wide" and insert therefor -- side --.

In claim 21 (Col. 8, line 4), delete "wide" and insert therefor -- side --.

Signed and Sealed this

Seventeenth Day of April, 2001

Attest:

NICHOLAS P. GODICI

Attesting Officer     Acting Director of the United States Patent and Trademark Office